Oct. 30, 1962 — A. E. GRAZEN — 3,061,525
METHOD FOR ELECTROFORMING AND COATING
Filed June 22, 1959 — 2 Sheets-Sheet 1

Inventor
Alfred E. Grazen

Inventor
Alfred E. Grazen

United States Patent Office 3,061,525
Patented Oct. 30, 1962

3,061,525
METHOD FOR ELECTROFORMING AND COATING
Alfred E. Grazen, Buffalo, N.Y., assignor to Platecraft of America, Inc., Buffalo, N.Y., a corporation of New York
Filed June 22, 1959, Ser. No. 822,024
8 Claims. (Cl. 204—9)

The present invention is directed to an improved method and apparatus for producing composite articles and to the articles themselves.

The present invention provides a means for manufacturing articles having characteristics which frequently cannot be matched by articles produced by well-known metallurgical techniques. With the present invention, true composite articles can be achieved, i.e., the most desirable properties of a metallic matrix and dispersed particles of various physical properties can be realized.

The processes of the present invention have wide applicability to the manufacture of numerous composite articles. One of the most important fields is that of making wear resistant materials. Most commonly employed wear resistant materials are heterogeneous in structure, that is, they contain two or more distinct, chemically different phases since in most cases, pure homogeneous metals have notoriously poor wear characteristics. Tool steel, copper-lead and babbitt bearings, cast iron, and cemented carbides are, in fact, dispersions of either hard particles in a comparatively soft matrix or soft particles in a comparatively hard matrix. Aside from the exceedingly hard, high melting materials such as diamonds or sapphires, most wear resistant materials are fabricated by normal metal technology or powder metallurgy techniques at high temperatures. The requirement for high temperature compatibility severely limits the compositions that can be prepared.

Since wear is entirely a surface phenomenon, engineers for many years have employed techniques to form a dispersion at the surface of parts subject to wear. Such techniques include operations such as nitriding, case hardening, hard facing, flame metallizing and the like. In these surface treatments, the metallurgical laws continue to place severe restrictions on the physics and the chemistry of the coatings produced.

The process of the present invention is a new approach to the preparation of dispersions. Because high temperatures are not employed, there is no severe restriction on the chemistry of the products. The particle size, shape, and concentration of the dispersed phase can be varied at will. The properties of the matrix can be controlled without affecting the dispersed phase. The net result is that with the process of the present invention, a truly flexible and controllable process for providing composite articles is realized.

In essence, the process of the present invention involves simultaneous electrodeposition of a metal and settling of electrically inert additive particles, under controlled conditions, to produce a composite structure in which the additive particles retain their discrete identity and are more or less homogeneously dispersed within the electroplated metal deposit. In describing the particles as "electrically inert" I mean that they do not become electrically charged during the electroplating operation. For most composite structures, the additives will be relatively poor conductors or non-conductors. Actually, the only limitation which exists in connection with the selection of additive for a particular metal is that the additive be substantially insoluble in the electrolyte employed to plate the selected metal under the electroplating conditions. That is why, with the process of the present invention, there can be produced such diverse materials as wood-working tools, stamping jigs, armature winding mandrels, electrical contacts, relay holding coils, drills, taps, gauges, drill bushings, dies, bearings, rocket nozzles, printing plates, friction materials, pistons and piston rings, gear housings, turbine bucket shrouds, mechanical seals, thrust bearings, conveyor parts, air probes, flutter dampers, retaining rings, lathe beds, aircraft propellers, cylinders, cutting tools, shears, and saws.

The only requirement to be possessed by the matrix metal is that it is capable of being electroplated from liquid solution. Accordingly, the metals which can be employed in the practice of the invention are extremely numerous and the following represents only a partial list of applicable metals: nickel, chromium, copper, cadmium, silver, gold, iron, nickel-cobalt alloys, cobalt, platinum, zinc, tin, lead, and brass.

The selection of the particular additive partices will, of course, be governed by the characteristics desired in the final product. Where the primary concern is the improvement of wear resistance, corrosion resistance, abrasion resistance, and the like, materials such as silicon carbide, aluminum oxide, tungsten carbide, titanium carbide, zirconium oxide, boron carbide, chromium carbide, iron oxide, thorium oxide, uranium oxide, rare earth oxides, or diamonds may be employed. Where lubrication is to be provided by the additive, materials such as molybdenum disulfide may be employed.

An object of the present invention is to provide an improved process for producing composite articles employing a metallic matrix.

Another object of the invention is to provide a process for the production of composite articles which is not limited in application by the physical and chemical limitations which are frequently encountered by other metallurgical processes.

Still another object of the invention is to provide an improved method for applying coatings of a wear resistant composite structure onto base articles.

A further object of the invention is to provide an improved apparatus for carrying out the process of the invention in a continuous manner.

A still further object of the invention is to provide improved composite coating structures having improved physical properties.

Another object of the invention is to provide a process for conserving precious metals by substituting a comparatively low cost additive while improving the wear and hardness properties of the precious metal.

Still another object is to provide a method of manufacturing dispersion hardened or strengthened alloy structures.

Another object is to prepare composites capable of being further improved by thermal treatment.

Another object is to provide a process for laying down a composite coating of a given thickness in a shorter period of time than by electroplating metal alone.

The process of the present invention involves simultaneous electrodeposition of a metal from a liquid electrolyte and settling of additive particles through the liquid electrolyte onto the surface of the article to be coated. The article is made the cathode in a normal electroplating system and the other conditions of electroplating are substantially the same as those employed in the absence of the additive particles.

In carrying out the process in a continuous manner, the liquid electrolyte containing the settlable additive particles in suspension is drawn past the article at a sufficiently slow rate so that the liquid flow in substantially laminar or viscous. At the same time, the article constituting the cathode in the electroplating process is subjected to agitation insufficiently severe to cause turbulence or a disruption of the essentially laminar characteristic of the liquid flow. Such agitation may consist, for example, of rotating the cathode at a slow velocity on the order of up to twenty-five revolutions per minute, or it may consist of oscillating or agitating the article at a predetermined rate. As the particles tend to collect on the workpiece, the metal being deposited by electrodeposition tends to trap the particles and cause them to adhere to the freshly plated surface. Excess particles are continuously removed due to the movement of the article since the motion is designed so that at some time in the cycle of movement, the article will be at an angle exceeding the angle of repose of unattached particles. This constant shedding of excess particles is extremely beneficial because it tends to eliminate the possibility of the particles shading, i.e., forming a substantially continuous phase and thereby trapping electrolyte within the pores thus created, resulting in a poor metal deposit. Particles which are shed from the surface then settle to the bottom of the electroplating tank where they may be removed and returned, along with particles which did not come into contact with the article surface, in the form of a slurry. Recirculation of this slurry recovered at the base of the electroplating tank back into the electrolyte for further settling is a convenient way of maintaining a uniform and controlled dispersion of the additive particles within the circulating electrolyte.

The electroplating conditions employed in the process of this invention are substantially identical to those employed in normal electroplating processes. Experiments have shown that the deposition of the additive particles onto the surface of the moving article does not require any cataphoretic action but is due solely to the settling of the particles through the body of the liquid and onto the article surface. Since the voltage employed in normal electroplating operations is usually in the order of 12 volts or less, the voltage gradients present in the electrolyte are insufficient to cause any cataphoretic deposition of the additive particles.

A wide variation in operating characteristics is possible within the scope of the present invention. Thus, the plating bath which may be employed depends essentially upon the character of the metal matrix desired and is not altered in its ability to deposit metal by the presence of the additive particles. Purely for purposes of example, there are listed below several conventional plating baths and plating conditions which may readily be employed in the practice of this invention:

NICKEL PLATING

| | |
|---|---|
| $NiSO_4 \cdot 7H_2O$ | 32 oz./gal. |
| $NiCl_2 \cdot 6H_2O$ | 6 oz./gal. |
| $H_3BO_3$ | 4 oz./gal. |
| pH | 1.5 to 3.0 or 4.5 to 5.6. |
| Temperature | 90–150° F. |
| Current density | 5–120 amps./sq. ft. |

COPPER PLATING

| | |
|---|---|
| $CuSO_4 \cdot 5H_2O$ | 33 oz./gal. |
| $H_2SO_4$ | 8 oz./gal. |
| Temperature | 75–120° F. |
| Current density | 20–40 amps./sq. ft. |

CHROMIUM PLATING

| | |
|---|---|
| Chromic acid | 30–50 oz./gal. |
| $H_2SO_4$ | 0.3–0.5 oz./gal. |
| Temperature | 100–160° F. |
| Current density | 60–500 amps./sq. ft. |

ZINC PLATING

| | |
|---|---|
| $ZnSO_4 \cdot 7H_2O$ | 40–60 oz./gal. |
| $AlCl_3 \cdot 6H_2O$ | 2–5 oz./gal. |
| $Na_2SO_4$ | 5–12 oz./gal. |
| pH | 3/4. |
| Temperature | 70–95° F. |
| Current density | 20–50 amps./sq. ft. |

CADMIUM PLATING

| | |
|---|---|
| CdO | 4–8 oz./gal. |
| NaCN | 10–20 oz./gal. |
| Temperature | 70–95° F. |
| Current density | 10–30 amps./sq. ft. |

TIN PLATING

| | |
|---|---|
| $Na_2SnO_3$ | 10–15 oz./gal. |
| NaOH | 1–2 oz./gal. |
| $NaC_2H_3O$ | 1–3 oz./gal. |
| $H_2O_2$ (25% by volume) | 0.2–0.5 oz./gal. |
| Temperature | 130–160° F. |
| Current density | 20–60 amps./sq. ft. |

IRON PLATING

| | |
|---|---|
| $FeCl_2 \cdot 4H_2O$ | 30–50 oz./gal. |
| $CaCl_2$ | 40–60 oz./gal. |
| Temperature | 180–210° F. |
| Current density | 40–60 amps./sq. ft. |

BRASS PLATING

| | |
|---|---|
| CuCN | 3–4 oz./gal. |
| $Zn(CN)_2$ | 1–2 oz./gal. |
| NaCN | 7–8 oz./gal. |
| $Na_2CO_3$ | 3–5 oz./gal. |
| Temperature | 90–120° F. |
| Current density | 2–5 amps./sq. ft. |

SILVER PLATING

| | |
|---|---|
| AgCN | 3.2 av. oz./gal. |
| NaCN | 4.5 av. oz./gal. |
| $KNO_3$ | 15 av. oz./gal. |
| Brightener | 1/8 fl. oz./gal. |
| Temperature | 72–78° F. |
| Current density | 5–15 amps./sq. ft. |

GOLD PLATING

| | |
|---|---|
| $KAu(CN)_2$ | 20–30 dwt./gal. |
| Free, KCN | 4 oz./gal. |
| $K_2CO_3$ | 2 oz./gal. |
| $K_2HPO_4$ | 4 oz./gal. |
| Temperature | 130–160° F. |
| Current density | 2–10 amps./sq. ft. |
| Anodes | Stainless steel |

The compositions enumerated above may, of course, contain conventional additives such as brighteners, grain refiners, hardeners, stress release additives, and the like.

The choice of particles for use in the process is governed primarily by their insolubility in the electrolyte under the conditions of electroplating, and their ability to settle through the electrolyte solution and become deposited upon the article. Particles ranging from submicron particle sizes to sizes of up to 20 mesh or more have been employed successfully with the practice of this invention. The particle geometry and density do, however, have some effect upon the settling rate and this should be borne in mind in the practice of the process. The particles should not be so fine that they agglomerate excessively or are held in suspension in the electrolyte, without settling. Because of the recirculation which the particles undergo continuously during the operation of the process, they should also be capable of circulation when in the form of a slurry.

The current density employed for any particular particle system should be adjusted to achieve a substantially continuous metallic electroplated matrix which holds the discrete additive particles embedded therein. When the current density is too low, an insufficient number of particles will be held, and when it is too high, the coating tends to bridge over the particles, instead of appearing between them, causing a more or less spongy, non-adherent structure to occur. The structure of either of these extreme conditions will be readily apparent after preliminary runs, and can be corrected by a proper adjustment of the current density.

The temperature of the plating bath affects viscosity and specific gravity of the electrolyte, and to that extent, influence the settling rate of the particles in the electrolyte. At too low a temperature, the metal electroplate may be of poor quality. At too high a temperature, the additive particles may settle too rapidly and cause shading. Again, either of these conditions can be readily corrected after the system has been in operation a short time.

The particle concentration in the electrolyte to a large extent depends upon the particle shape, size, size distribution, and density. Ultimately, of course, the amount of particles added in suspension is determined by the relative number of particles desired in the final coating, but the amount of particles in suspension in the electrolyte for any given desired concentration in the final coating may vary depending upon the factors mentioned above. Particles which settle rather rapidly, such as needle-shaped particles or small round particles can be employed in relatively dilute suspensions on the order of 0.1% to 10% by volume, but particles such as flake shaped particles which settle relatively slowly are usually added in larger amounts.

The final concentration of additive particles in the composite structure can be adjusted according to the use to which the article is to be put. Articles produced according to the present invention may have as little as one-half percent by volume of additive, and in some cases, have exceeded 50% by volume. For most wear resistant and abrasion resistant articles, I have found that a final concentration of 20% to 30% by volume of hard particles such as silicon carbide or tungsten carbide provides good characteristics.

The amount of the particle additive in suspension may be very conveniently controlled by recirculation of a portion of the non-deposited additive particles from the bottom of the electroplating tanks continuously into the top of the electrolyte. In order to avoid disturbing the laminar flow of the electrolyte, it is advisable to introduce the particles slightly below the surface of the electrolyte in the tank in an upward or alteral direction so that particles do not have a downward component of velocity at the time they are introduced into the electrolyte.

The rate of movement of the article being plated should be such as to provide controlled shedding of the non-deposited particles. At too high a rate of movement, there will be too much metal deposited in comparison to the number of additive particles adhering so that there will be a tendency to produce stratification. At too low a rate of rotation, too many additive particles will be deposited with the possibility of shading, as previously explained. The rate of movement of the article should be sufficiently low so that it does not disturb the essentially laminar conditions existing in the electrolyte. At the same time it should be high enough to provide the continuous shedding. Generally, where the article is rotated, I prefer to use a rate of rotation on the order of 1 to 25 revolutions per minute, depending on the cross-sectional dimensions of the work.

A further description of the present invention will be made in conjunction with the attached sheets of drawings which illustrate an apparatus suitable for practicing the process, and also illustrate structures produced by the method of the present invention.

Figure 1:
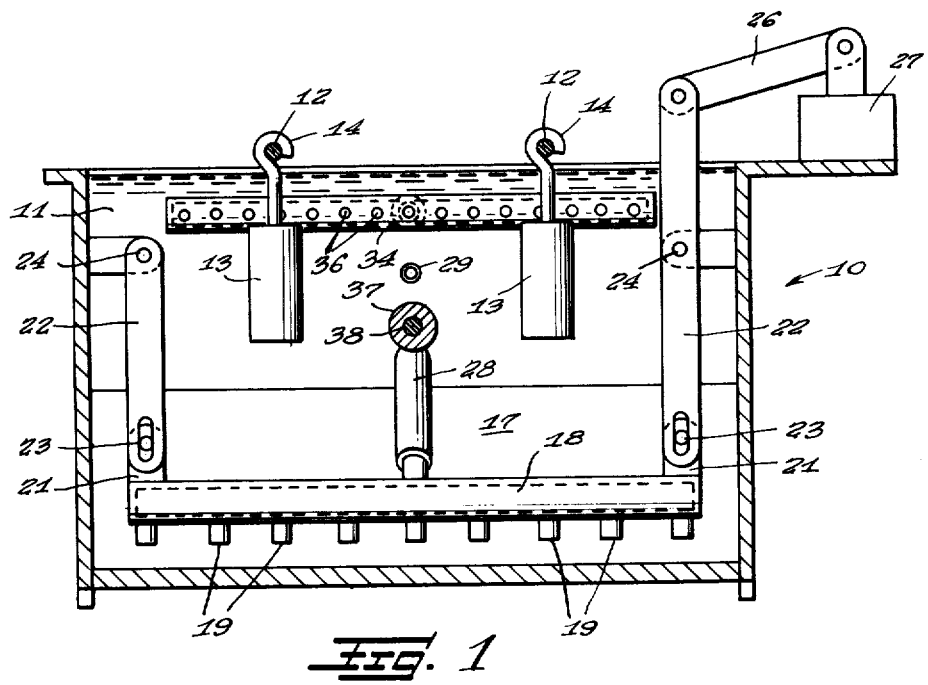
FIGURE 1 is a view in elevation, partly in cross-section illustrating an apparatus which can be employed in the practice of the present invention.

In FIGURE 1, reference numeral 10 indicates generally an electroplating tank containing a liquid electrolyte 11. A plurality of bus bars 12 support spaced anodes 13 within the electrolyte 11 by means of hooks 14. The bus bars 12 are connected to a suitable source of voltage (not shown) adequate for the electroplating operation involved.

Figure 2:
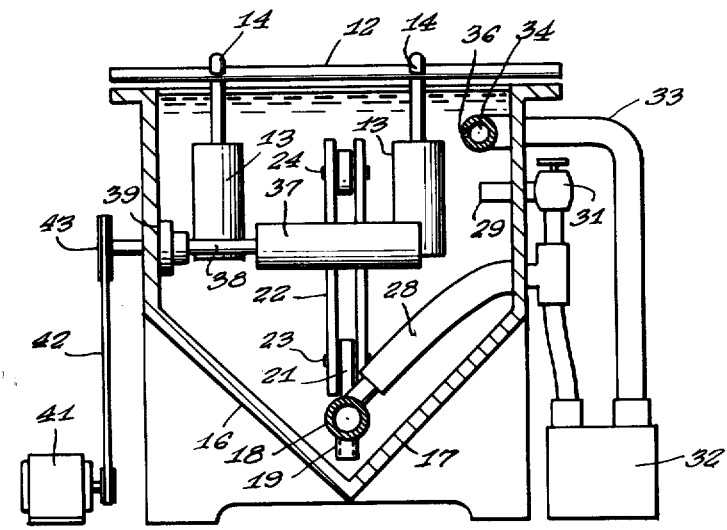
FIGURE 2 is a cross-sectional view taken substantially along the line II—II of FIGURE 1.

As best illustrated in FIGURE 2, the base of the tank 10 has a pair of walls 16 and 17 meeting to form a V-shaped trough at the base of the tank 10. The angle between the walls 16 and 17 is sufficiently small so that it exceeds the angle of repose for additive particles settling out of the electrolyte 11. Generally, the angle between the walls 16 and 17 should not exceed about 60°. The V-shaped tank forms the preferred embodiment of the invention, but tanks of other shapes can also be employed.

Disposed near the apex of the V-shaped tank bottom is an intake manifold 18 having a plurality of inlet tubes 19 extending downwardly from the manifold 18. The vertical positioning of the manifold 18 with respect to the apex of the trough may be selectively varied by means of arms 21 connected to links 22 by means of bolts or the like extending between opposed slots 23 in both the arms 21 and the links 22.

As the additive particles settle at the base of the trough, they form a relatively thick suspension of solid matter in a relatively small amount of liquid. In order to suspend this precipitated matter into the electrolyte and thereby form a pumpable slurry, the manifold 18 is reciprocated horizontally by providing pivot pins 24 on the links 22, and pivoting the entire assembly by the mechanism of an arm 26 connected to a motor 27. For most purposes, it will be sufficient to reciprocate the manifold 18 at a rate of about 1 to 4 times a minute.

The slurry which is picked up through the tubes 19 is withdrawn from the manifold 18 by means of a flexible conduit 28. This slurry is then combined with additional amounts of the electrolyte by withdrawing a portion of the electrolyte through an intake pipe 29. A valve 31 controls the amount of electrolyte combined with the slurry in the conduit 28 to enable the operator to adjust the concentration of additive particles in the material being recirculated into the tank. The mixture of slurry and withdrawn electrolyte is circulated by means of a pump 32 and a conduit 33 into an exhaust manifold pipe 34 preferably disposed slightly below the surface of the electrolyte 11. As indicated in FIGURE 1, the exhaust manifold 34 has a plurality of outlet ports 36 which direct the recirculated electrolyte and additive particles laterally, to avoid, as much as possible, interference with the essentially laminar flow conditions existing within the tank 10.

The article to be coated, which in the illustrated form of the invention may take the form of a cylinder 37 is supported between the opposed anodes 13 on a shaft 38. The latter extends through a seal 39 and is rotated at an angular velocity on the order of 1 to 5 revolutions per minute by a motor 41 driving a chain 42 connected to a sprocket 43 secured to the shaft 38.

Figure 3:
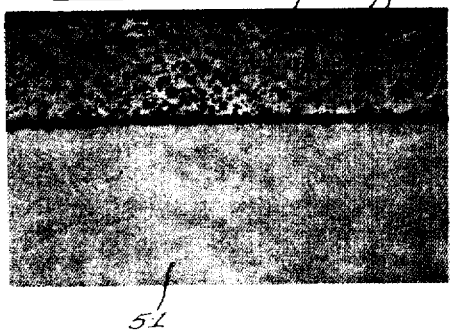
FIGURE 3 is a reproduction of a photomicrograph, originally at a magnification of 250×, illustrating a composite structure in which the combination of alumina and nickel is deposited upon an aluminum base.

In FIGURES 3 to 6 inclusive there are illustrated several different forms of coatings which have been produced according to the process of the invention. In FIGURE 3, reference numeral 51 indicates a base of aluminum metal upon which a composite coating consisting of a matrix of nickel 52 containing discrete, dispersed particles of alumina 53 is securely bonded. The alumina particles constitute approximately 10.6% by weight of the coating.

Figure 4:
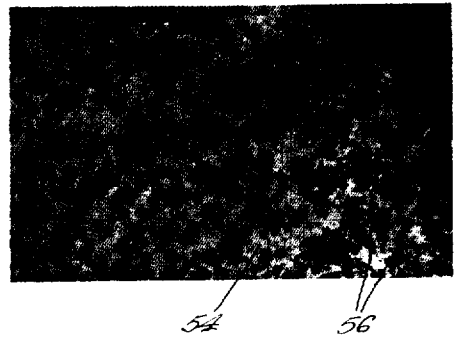
FIGURE 4 is a reproduction of a photomicrograph of a composite coating, originally taken at a magnification of 250×, employing the combination of silicon carbide in a matrix of silver.

In FIGURE 4, there is illustrated a composite coating consisting of a matrix of silver 54 containing silicon carbide particles 56 as an additive, the particles constituting approximately 6% by weight of the composite coating.

Figure 5:
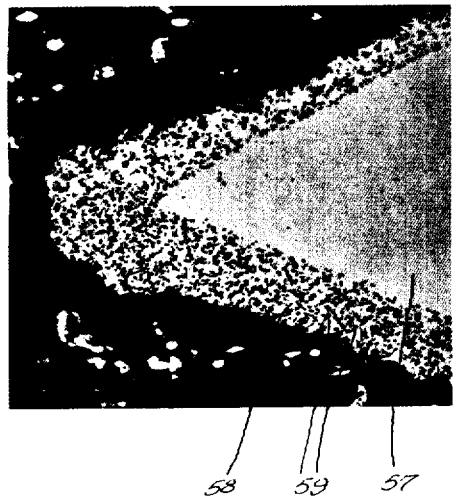
FIGURE 5 is a reproduction of a photomicrograph, originally at 120 magnification, of a longitudinal section through a wood saw tooth coated with the combination of silicon carbide and nickel.

FIGURE 5 illustrates a saw tooth having a steel base 57 coated with the combination of a nickel matrix 58 having dispersed particles 59 of silicon carbide dispersed therethrough. The coating had a Rockwell "C" hardness of 57.5.

Figure 6:
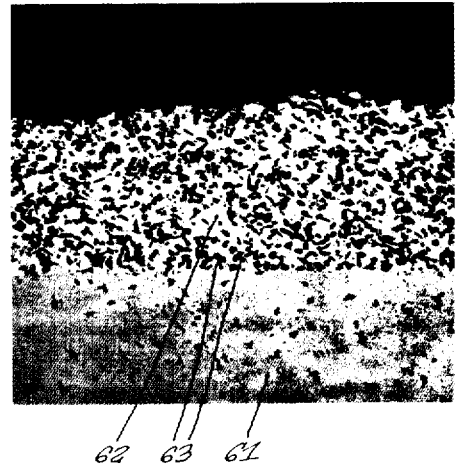
FIGURE 6 is a reproduction of a photomicrograph, originally at 250 magnification, of a progressive plug gauge coated with a composite coating of silicon carbide and nickel.

In FIGURE 6, there is illustrated a coated progressive plug gauge having a base 61 of a metal alloy having a hardness of 66 on the Rockwell "C" scale. The composite coating consisted of a matrix of nickel 62 containing dispersed silicon carbide particle 63, the composite coating having a hardness of 60 on the Rockwell "C" scale.

The following specific examples illustrate methods involved in the practice of the present invention.

Example I

The equipment employed was a 100 gallon rectangular tank with a V-shaped bottom of the type illustrated in the drawings. The specimen to be plated was a steel tube having an outer diameter of one inch and a length of two inches. The entire outer diameter of the tube was coated. The additive particles consisted of silicon carbide having an average particle size of 7 microns.

The tube was thoroughly degreased and cleaned, and then thoroughly rinsed. Immediately after rinsing, the tube was mounted in the electroplating tank containing the circulating mixture of electrolyte and additive particles. In this example, the additive particles constituted 2.5% of the volume of the suspension. The workpiece was rotated at one revolution per minute, and the electrolyte suspension was circulated at the rate of 150 gallons per hour. The electrolyte employed was a standard nickel plating electrolyte operating at a current density of 48 amperes per square foot.

After one hour of plating under the conditions mentioned, the tube was coated with a composite structural material having a thickness of approximately 0.003 inch. At the same conditions, only 0.0025 inch of nickel would be deposited without the additive. The composite structure consisted of a nickel matrix and silicon carbide particles evenly distributed throughout. The composite coating consisted of 70% by volume of nickel and about 30% by volume of silicon carbide. Due to the fine size of the additive particles, the external finish of the article was smooth and ready for use.

Example II

In this example, the specimen to be plated was the steel tube of the same size as in Example I. The additive particles constituted aluminum oxide having an average particle size of 7 microns, and a conventional nickel plating electrolyte was employed. After cleaning, the article was immersed in the electrolyte and rotated at a rate of one revolution per minute. The electrolyte plus additive mixture was circulated at the rate of 150 gallons per hour, and the additive particles constituted 2.3% of the volume of the circulating mixture. The current density employed was 50 amperes per square foot.

After one hour of plating under the conditions stated, the steel tube was coated to a thickness of approximately 0.003 inch with a composite structure consisting of a nickel matrix constituting 75% by volume of the coating and aluminum oxide particles constituting 25% by volume. The external surface was smooth and ready for use.

Example III

In this run, the additive particles consisted of tungsten carbide having an average particle size in the range from 2 to 3 microns. The particles constituted 1% by volume of the circulating mixture and the rate of mixture circulation was 150 gallons per hour. The work was rotated at one revolution per minute and the current density employed was 42 amperes per square foot. After one hour of plating the tube was coated with a composite structure to a thickness of approximately 0.003 inch. The structure consisted of a nickel matrix in an amount of 75% by volume and tungsten carbide particles evenly distributed throughout the matrix and constituting 25% by volume of the composite.

Example IV

In this example, the additive particles consisted of zirconium oxide having a particle size of 10 to 20 microns. The work was rotated at the rate of one revolution per minute. The nickel electroplating electrolyte contained 1.7% by volume of the additive particles, and was circulated at the rate of approximately 150 gallons per hour. The current density employed was 48 amperes per square foot.

After one hour of plating, the tube was coated with a composite material to a thickness of approximately 0.003 inch. It consisted of a nickel matrix (85% by volume) and zirconium oxide particles (15% by volume) evenly distributed throughout.

Example V

In this procedure, the electrolyte consisted of a standard acid copper electrolyte and aluminum oxide particles having an average particle size of 7 microns were employed as the additive. The steel tube was rotated at the rate of one revolution per minute. The electrolyte contained 1.5% by volume of the additive particles, and was circulated at the rate of approximately 150 gallons per hour. The current density was 52 amperes per square inch.

After one hour of plating, the tubes was coated with a composite structural material to a thickness of approximately 0.004 inch. The composite structure consisted of a copper matrix (90% by volume) and aluminum oxide (10% by volume) evenly distributed throughout the matrix.

Example VI

In this run, the electrolyte was a standard cadmium plating electrolyte and the particles employed were silicon carbide particles having an average size of 7 microns. The work was rotated at a rate of one revolution per minute. The additive particles constituted 1.5% by volume of the circulating electrolyte solution and the rate of mixture circulation was 150 gallons per hour. The current density employed was 23 amperes per square foot.

After one hour of deposition, the tube was coated with a composite material having a thickness of approximately 0.004 inch. The composite structure consisted of a cadmium matrix and silicon carbide particles evenly distributed therethrough. The cadmium constituted 85% by volume of the composite and the silicon carbide constituted the remaining 15%.

Example VII

In this run, the electrolyte employed was a standard silver cyanide solution, and the particles consisted of silicon carbide having an average size of 7 microns. The particles constituted 1.75% by volume of the circulating mixture and the rate of circulation was approximately 150 gallons per hour. The work was rotated at one revolution per minute, and a current density of 15 amperes per square foot was employed.

After one hour of plating, the tube was coated with a composite structure having a thickness of approximately 0.0045 inch. The composite material consisted of a silver matrix (75% by volume) and 25% by volume of silicon carbide particles evenly distributed throughout the matrix.

*Example VIII*

The electrolyte employed was a standard nickel electroplating solution. The additive particles consisted of a mixture of equal parts of silicon carbide having a particle size of 7 microns and tungsten carbide having a particle size of 3 microns. The tungsten carbide constituted 0.6% by volume of the circulating mixture, and the silicon carbide constituted 1.8% by volume. The mixture was circulated at 150 gallons per hour. The work was rotated at one r.p.m., and the current density employed was 44 amperes per square inch.

After one hour of plating, the tube was coated with a composite material having a thickness of approximately 0.003 inch. The structure consisted of a nickel matrix having particles of silicon carbide and tungsten carbide evenly distributed throughout. The percentage by volume of nickel was 70 and silicon carbide and tungsten carbide particles were present in amounts of about 15% each. This test also indicates that with different sized particles, allowance should be made for different settling rates. In the example given, this was compensated for by employing a volume ratio of silicon carbide about three times that for the smaller tungsten carbide particles.

Physical tests on the composite materials produced according to the present invention have indicated rather unique properties in the products. Coatings of silicon carbide-nickel have been prepared which have a micro hardness of 63 on the Rockwell "C" scale. The coatings retain their hardness at temperatures up to 500° F. Because of the fine particle size which can be employed, it is practical to apply composite coatings as thin as .0001 inch in thickness.

Silicon carbide-nickel coatings have significant ductility. A coating of 0.008 inch in thickness applied to an annealed tool steel specimen was bent to fracture over a ½ inch radius. The coating did not flake and remained firmly attached to the base metal. A similar chromium plated specimen coated to a thickness of 0.0015 inch failed by flaking from the surface of the base metal.

A coating of silicon carbide-nickel of a thickness of 0.001 inch on tool steel (55 Rc) was impacted by a steel ball 5/32 of an inch in diameter at a velocity of 875 feet per second, releasing 31 ft. lbs. of energy. The silicon carbide-nickel deposit deformed with failure; a chromium plated specimen chipped, cracked and blistered under the same condtions.

A progressive plug gauge coated with the combination silicon carbide-nickel was tested in a large automotive plant. The gauge was ground and lapped to meet Class XX gauge tolerance. The gauge lost 0.00002 inch in the first 16 days of operation. After 28 days of operation, the gauge had lost 0.00005 inch. Conventional gauges employed at this plant wore an average of 0.0002 inch in 1.3 days.

A coating of aluminum oxide-nickel produced according to the present invention withstood 2,000 cycles of torch heating to 1975° F. followed by air blast quenching to 300° F. before failure occurred in the base metal. The silicon carbide-nickel coatings repeatedly water-quenched from 1200° F. showed no signs of cracking, whereas chromium plate under the same conditions failed by cracking.

The bearing compatibilities of several coatings produced according to the invention were compared with other materials in the following tests. The outer diameter surface of a two-inch diameter bearing race composed of 52100 steel was revolved at 400 r.p.m. against a flat blocked loaded by means of weights. The coated surface was flooded with HD 10W-30 oil held at 140° F. by means of an external heat exchanger. The test was started at a load of 900 p.s.i. and the load was increased by 600 p.s.i. every minute until seizure occurred. The following table illustrates how various composite materials produced according to this invention compare with more conventional bearing materials:

SCUFF RESISTANCE OF SAE 52100 RINGS AGAINST VARIOUS BLOCK MATERIALS

| Block material: | Surface breakdown pressure, p.s.i. |
|---|---|
| Hard nickel electroplate | 2,200 |
| Composite $Al_2O_3$—Ni | 8,900 |
| SAE 52100 | 30,000 |
| Composite SiC—Ni | 28,800 |
| Composite WC—Ni | 36,700 |

The differences in bearing compatibility between a silicon carbide-silver composite and silver plate are particularly marked:

WEIGHT LOSS IN GRAMS OF COATED BLOCKS AND 52100 RINGS AFTER RUNNING AT 1200 P.S.I.

| Test Time | SiC-Ag Composite Coated Block | | | | Silver Coated Block | | | |
|---|---|---|---|---|---|---|---|---|
| | Block Wt. Loss | Cum. | Ring Wt. Loss | Cum. | Block Wt. Loss | Cum. | Ring Wt. Loss | Cum. |
| 10 min | .0039 | .0039 | .0012 | .0012 | .0327 | .0327 | .0011 | .0011 |
| 20 min | .0012 | .0051 | .0011 | .0023 | .0170 | .0497 | .0014 | .0025 |
| 30 min | .0014 | .0065 | .0002 | .0025 | .0161 | .0658 | .0006 | .0031 |
| 40 min | .0007 | .0072 | .0001 | .0026 | | | | |

In addition to the reduction in weight loss encountered by the addition of a hard particle phase to the silver coating, superior resistance to upsetting of the composite was observed. In the first ten minutes of testing, the pure silver coating upset to the extent that the base metal appeared at the center of the wear track. This never occurred with the composite coating.

Dowel pins used to locate rough castings of cylinder heads formerly lasted 10 to 14 days when made of tool steel or chromium plated tool steel. Pins coated with the combination of silicon carbide-nickel lasted 6 weeks or more for a life improvement of 300 to 500%.

Silicon carbide-nickel coated high speed hacksaw blades evidenced an improvement in life of 100% over uncoated blades. A silicon carbide-nickel coated band saw blade lasted for 26 cuts on SAE 4340 steel having a Rockwell "C" hardness of 43-45 as opposed to 15 cuts for an uncoated blade. The coating withstood the continual flexing encountered in the operation of the band saw without any signs of fatigue failure, cracking or peeling of the coating.

The composite coatings of the present invention when applied to hot coining punches and extruding die inserts increased the lives of these parts substantially. The minimum improvement in life, based upon 400 tests, was about 50%, and the average increase was about 100%.

The physical properties of the composite articles may be further improved by heat treatment to cause dispersion hardening.

The coating process of the present invention is also readily applicable to the formation of articles by electroforming. In this type of process, the article to be coated is a master made of a material which can be readily removed, as by dissolution from the subsequently applied coating. The material of the master should, however, be sufficiently hard so that it can be machined to extremely fine tolerances and to a high surface finish. The composite coating of metal and solid particles is then applied to this master, while the master is made the cathode in the electroplating operation. Then, the master is removed, preferably by dissolution in a suitable acid or alkali solvent chosen so that it will readily dissolve the master without materially affecting the composite coating.

This application is a continuation-in-part of my copending application Serial No. 672,970 entitled "Method of Treating the Surfaces of an Article," filed July 19, 1957, and now abandoned.

I claim as my invention:

1. The method of coating an article which comprises making said article a cathode in an electroplating bath, continuously flowing past said article an electroplating electrolyte having suspended therein solid particles which are substantially insoluble in said electrolyte, continuously moving said article while in said electrolyte to cause continuous shedding of unadhered particles from the surface of said article during such movement while said article is being electroplated within said bath, withdrawing electrolyte and particles from said bath, reintroducing controlled amounts of the withdrawn electrolyte and particles back into the bath to thereby control the concentration of additive particles in said bath, and continuing the steps of electrolyte flow, article movement, shedding, and electrolyte withdrawal until a uniform dispersion of discrete particles within an electroplated matrix is built up on the article.

2. The method of coating an article which comprises making said article a cathode in an electroplating bath, continuously flowing past said article an electroplating electrolyte having suspended therein solid particles which are substantially insoluble in said electrolyte, continuously rotating said article while in said electrolyte to cause continuous shedding of unadhered particles from the surface of said article during such rotation while said article is being electroplated within said bath, withdrawing electrolyte and particles from said bath, reintroducing controlled amounts of the withdrawn electrolyte and particles back into the bath to thereby control the concentration of additive particles in said bath, and continuing the steps of electrolyte flow, article rotation, shedding, and electrolyte withdrawal until a uniform dispersion of discrete particles within an electroplated matrix is built up on the article.

3. The method of coating an article which comprises making said article a cathode in an electroplating bath, continuously flowing past said article an electroplating electrolyte having suspended therein solid particles which are substantially insoluble in said electrolyte, continuously moving said article while in said electrolyte to cause continuous shedding of unadhered particles from the surface of said article during such movement while said article is being electroplated within said bath, withdrawing electrolyte and particles from said bath, reintroducing controlled amounts of the withdrawn electrolyte and particles back into the bath below the surface of the electrolyte in said bath, and continuing the steps of electrolyte flow, article movement, shedding, and electrolyte withdrawal until a uniform dispersion of discrete particles within an electroplated matrix is built up on the article.

4. In the method of depositing a coating of discrete additive particles in an electroplated matrix in which the article to be coated is made the cathode in an electroplating electrolyte and insoluble solid particles are settled by gravity onto the surface of said article during electrodeposition of metal from said electrolyte onto said surface in an electroplating zone, the improvement which comprises continuously withdrawing electrolyte and additive particles dispersed therein from the electroplating zone and continually recirculating the particles dispersed in said electrolyte back into the electroplating zone for further settling of the particles therethrough.

5. In the method of depositing a coating of discrete additive particles in an electroplated matrix in which the article to be coated is made the cathode in an electroplating electrolyte and insoluble solid particles are settled by gravity onto the surface of said article during electrodeposition of metal from said electrolyte onto said surface in an electroplating zone, the improvement which comprises continuously withdrawing electrolyte and additive particles dispersed therein from the electroplating zone and recirculating the electrolyte plus particles back into the electroplating zone in sufficient amounts to provide a particle concentration of from about 0.1 to 10% by volume of said electrolyte in said electroplating zone.

6. In the method of depositing a coating of discrete additive particles in an electroplated matrix in which the article to be coated is made the cathode in an electroplating electrolyte and insoluble solid particles are settled by gravity onto the surface of said article during electrodeposition of metal from said electrolyte onto said surface in an electroplating zone, the improvement which comprises continuously withdrawing electrolyte and additive particles dispersed therein from the electroplating zone, recirculating the electrolyte plus particles back into the electroplating zone in sufficient amounts to provide a particle concentration of from 0.1 to 10% by volume of said electrolyte in said electroplating zone, and continuing the settling and electroplating until a uniform coating of discrete particles in a matrix of electroplated metal is built up on said article, said coating containing from about ½ to 50% by volume of particles.

7. The method of electro-forming an article which comprises providing a master, making said master the cathode in an electroplating bath, continuously flowing an electrolyte containing a uniform dispersion of solid particles insoluble in said bath past said master to cause at least some of the particles to impinge on said master, continuously electroplating metal from said bath onto said master to thereby trap particles impinging thereon by the deposited metal, moving said master during such electroplating to cause continuous shedding of unadhered particles from the surface of said master, collecting non-adhering particles, recirculating the collected particles together with electrolyte back into the bath to maintain a uniform dispersion of particles in said bath, continuing the flowing, impinging and electroplating until a uniform dispersion of particles in an electroplated metal matrix is built up as a self-sustaining structure on said master, and thereafter removing the master from the matrix.

8. The method of electro-forming an article which comprises providing a master, making said master the cathode in an electroplating bath, continuously flowing an electrolyte containing a uniform dispersion of solid particles insoluble in said bath past said master to cause at least some of the particles to impinge on said master, continuously electroplating metal from said bath onto said master to thereby trap particles impinging thereon by the deposited metal, continuously rotating said master during such electroplating to cause continuous shedding of unadhered particles from the surface of said master, collecting non-adhering particles, recirculating the collected particles together with electrolyte back into the bath to maintain a uniform dispersion of particles in said bath, continuing the flowing, impinging, and electroplating until a uniform dispersion of particles in an electroplated metal matrix is built up as a self-sustaining structure on said master, and thereafter removing the master from the matrix.

(References on following page)

References Cited in the file of this patent

UNITED STATES PATENTS

| | | |
|---|---|---|
| 1,702,927 | Bezzenberger | Feb. 19, 1929 |
| 2,196,355 | Cremer | Apr. 9, 1940 |
| 2,347,920 | Mays | May 2, 1944 |
| 2,350,669 | Boller | June 6, 1944 |
| 2,359,920 | Keeleric | Oct. 10, 1944 |
| 2,360,789 | Seligman et al. | Oct. 17, 1944 |
| 2,424,140 | Beecher | July 15, 1947 |
| 2,763,919 | Kempe et al. | Sept. 25, 1956 |
| 2,799,081 | Farnham | July 16, 1957 |
| 2,878,171 | Ferrand | Mar. 17, 1959 |

OTHER REFERENCES

Metal Finishing, April 1956, pages 58–66.